United States Patent
Baumann et al.

(10) Patent No.: US 6,845,853 B2
(45) Date of Patent: Jan. 25, 2005

(54) WHEEL BRAKE DEVICE

(75) Inventors: Dietmar Baumann, Hemmingen (DE); Hanniel Schmidt, Karlsbad (DE); Herbert Vollert, Vaihingen/Enz (DE); Frieder Keller, Ubstadt-Weiher (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/381,241

(22) PCT Filed: Sep. 19, 2001

(86) PCT No.: PCT/DE01/03596
§ 371 (c)(1), (2), (4) Date: Aug. 27, 2003

(87) PCT Pub. No.: WO02/25136
PCT Pub. Date: Mar. 28, 2002

(65) Prior Publication Data
US 2004/0026184 A1 Feb. 12, 2004

(30) Foreign Application Priority Data
Sep. 22, 2000 (DE) .......................... 100 46 981

(51) Int. Cl.⁷ .......................... F16D 55/08; B60T 13/04
(52) U.S. Cl. ...................... 188/72.9; 188/72.8; 188/167
(58) Field of Search .............................. 188/72.7, 72.8, 188/72.9, 166, 167, 24.22, 72.6

(56) References Cited

U.S. PATENT DOCUMENTS

| | | | | |
|---|---|---|---|---|
| 1,311,939 A | * | 8/1919 | Worley et al. | 188/166 |
| 2,112,900 A | * | 4/1938 | McColly | 188/166 |
| 4,290,507 A | * | 9/1981 | Brown | 188/167 |
| 4,817,463 A | * | 4/1989 | Cameron | 188/2 D |
| 5,845,834 A | * | 12/1998 | Ahn | 188/166 |
| 6,662,908 B2 | * | 12/2003 | Gradert et al. | 188/72.9 |

FOREIGN PATENT DOCUMENTS

| | | | |
|---|---|---|---|
| DE | 38 24 812 A | * 1/1990 | |
| WO | WO 90/14979 A1 | * 12/1990 | |
| WO | WO 01/44677 A1 | * 6/2001 | F16D/65/16 |

* cited by examiner

Primary Examiner—Thomas Williams
(74) Attorney, Agent, or Firm—Ronald E. Greigg

(57) ABSTRACT

A wheel brake device, which in particular is actuatable electromechanically, for a motor vehicle, includes a pivotable lever, one end of which is engaged by an energy-storing spring element and which with its other end presses against a wheel brake lining. The lever is pivotably supported by a support means that is displaceable in the longitudinal direction of the lever. By displacement of the support means in the longitudinal direction of the lever, a lever arm with which the energy-storing spring element engages the lever lengthens, and a lever arm with which the lever presses against the wheel brake lining shortens. A pressure force with which the energy-storing spring element, via the lever, presses the wheel brake lining against a brake disk can be adjusted by displacement of the support means.

7 Claims, 1 Drawing Sheet

WHEEL BRAKE DEVICE

CROSS-REFERENCE TO RELATED APPLICATIONS

This application is a 35 USC 371 application of PCT/DE 01/03596 filed on Sep. 19, 2001.

BACKGROUND OF THE INVENTION

1. Field of the Invention

The invention relates to an improved vehicle wheel brake device.

2. Description of the Prior Art

Wheel brake devices of the type with which this invention is concerned are known per Se, and have a wheel brake lining, which for generating a braking moment can be pressed against a brake body that is connected to a vehicle wheel in a manner fixed against relative rotation, the brake body for instance being a brake disk or a brake drum. These days, pressing the wheel brake lining against the brake body is predominantly done hydraulically, but increasingly, wheel brake devices are also proposed in which the wheel brake lining is pressed electromechanically against the brake body.

SUMMARY OF THE INVENTION

The wheel brake device of the invention has a pivotable lever for pressing the wheel brake lining against the brake body. To generate a braking moment, the wheel brake lining can be pressed against the brake body by pivoting the lever, and for releasing the wheel brake device, it can be lifted from the brake body by pivoting the lever in reverse. The wheel brake device of the invention furthermore has an energy-storing spring element, which engages the lever at a point spaced apart from the wheel brake lining and urges the lever in the direction of pressing the wheel brake lining against the brake body, that is, in the direction of actuating the wheel brake device. The energy-storing spring element can for instance be a metal spring such as a coil spring, or a spring of some other elastic material. Using a gas compression spring as an energy-storing spring element is also possible, as an example. Some, or optionally all, of the energy required for pressing the wheel brake lining against the brake body originates in the energy-storing spring element; hence for actuating the wheel brake device of the invention, less actuating energy is needed.

The lever of the wheel brake device of the invention has a nonrectilinear sliding guide. At this sliding guide, the lever is supported pivotably by a support means, which in turn is displaceable in the longitudinal direction of the lever. The lever is accordingly acted upon at three points: First, the lever is urged by the wheel brake lining, or conversely, the lever urges the wheel brake lining, upon actuation of the wheel brake device. Second, the lever is urged by the energy-storing spring element, at a point spaced apart from the wheel brake lining, in the direction of actuating the wheel brake device and pressing the wheel brake lining against the brake body. Third, the lever is acted upon by the support means on which it is pivotably supported. Since the support means, and thus a point at which the lever is pivotably supported, is displaceable in the longitudinal direction of the lever, effective lever arms with which the wheel brake lining and the energy-storing spring element engage the lever can be varied. By displacement of the support means in the longitudinal direction of the lever, a ratio between the effective lever arms with which the wheel brake lining on the one hand and the energy-storing spring element on the other, is varied. By displacement of the support means along the lever, a force exerted by the energy-storing spring element on the wheel brake lining via the lever can thus be varied. This is utilized in the wheel brake device of the invention for its actuation: For pressing the wheel brake lining against the brake body, the support means of the lever is displaced in the longitudinal direction of the lever such that an effective lever arm with which the energy-storing spring element engages the lever lengthens, and/or an effective lever arm with which the brake body engages the lever shortens. By displacement of the support means in the longitudinal direction of the lever, a force that the energy-storing spring element exerts on the wheel brake lining via the lever, that is, a force with which the energy-storing spring element presses the wheel brake lining against the brake body via the lever, can thus be varied, and as a result a desired braking moment can be generated. For releasing the wheel brake device, the support means is displaced in the opposite direction.

To keep a force required for displacing the support means and thus for actuating the wheel brake device slight, according to the invention the course of the nonrectilinear sliding guide of the lever is selected such that the sliding guide, at the applicable support point, extends parallel or at least approximately parallel to a displacement direction of the support means. The support point is meant to be the point where the support means pivotably supports the lever. Because of the displaceability of the support means, the support point is movable in the longitudinal direction of the lever, specifically along its sliding guide. If at the applicable support point the sliding guide of the lever extends parallel to the displacement direction of the support means, then no force for pivoting the lever and for pressing the wheel brake lining against the brake body is brought to bear by the support means upon its displacement. In this case, for displacing the support means and thus for actuating the wheel brake device, only the force of friction required for the displacement has to be overcome. If at the applicable support point the sliding guide extends approximately parallel to the displacement direction of the support means, then the force brought to bear by the support means upon displacement for pivoting the lever and for pressing the wheel brake lining against the brake body is slight. As a result, a force required for actuating the wheel brake device is low. The force required for pressing the wheel brake lining against the brake body is exerted entirely or in part by the energy-storing spring element. As a result, the wheel brake device of the invention is result suitable for electromechanical actuation with a low-power, small-sized, lightweight electric motor. There is only a slight load on an on-board electrical system of a motor vehicle equipped with the wheel brake device of the invention. Moreover, finely-graduated metering of a braking moment of the wheel brake device of the invention can be attained.

In one embodiment of the invention, an automatic readjusting device for establishing an air gap, or play between the wheel brake lining and the brake body is provided, to compensate for lining wear. By means of the readjusting device, it is achieved at least approximately that an angular position of the lever, and thus the lever ratios with which the energy-storing spring element and the wheel brake lining engage the lever are independent of any wear of the wheel brake lining. The force with which the energy-storing spring element, via the lever, presses the wheel brake lining against the brake body is as a result dependent only on the support point where the support means supports the lever, and not on the condition of wear of the wheel brake lining.

BRIEF DESCRIPTION OF THE DRAWINGS

The invention is described below in detail in terms of an exemplary embodiment shown in the drawings, in which.

DESCRIPTION OF THE PREFERRED EMBODIMENT

Figure 1:
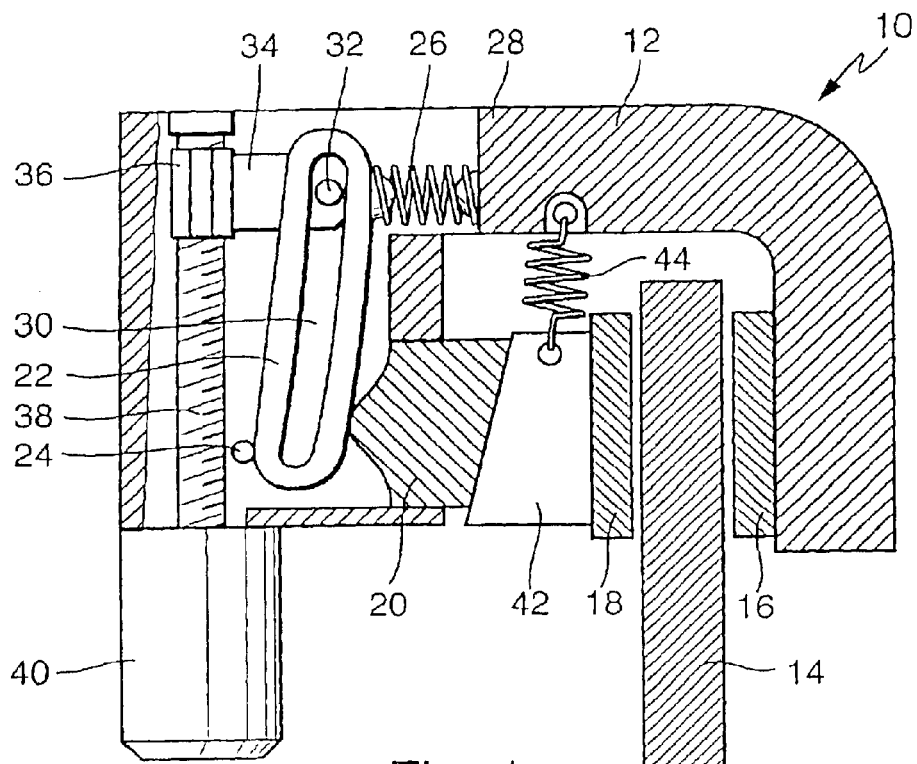
FIG. 1 is a simplified schematic illustration of an exemplary embodiment of a wheel brake device of the invention in the released state.

The wheel brake device 10 of the invention, shown in the drawing, is embodied as a disk brake. The wheel brake device 10 has a disk brake caliper 12, which is embodied as a floating caliper that is movable transversely to a brake disk 14. A fixed wheel brake lining 16 rests in the disk brake caliper 12 and is disposed on one side of the brake disk 14. Another wheel brake lining 18 is disposed on an opposite side of the brake disk 14 in the disk brake caliper 12. This wheel brake lining 18 is guided displaceably, transversely to the brake disk 14, in the disk brake caliper 12 by means of a brake shoe 20. For actuating the wheel brake device 10, the displaceable wheel brake lining 18 is pressed against one side of the brake disk 14. A reaction force displaces the disk brake caliper 12 transversely to the brake disk 14 in a manner known per se, so that the other, fixed wheel brake lining 16 is pressed against the other side of the brake disk 14, and the brake disk 14 is braked.

For actuating the wheel brake device 10, that is, for pressing the wheel brake lining 18 against the brake disk 14, the wheel brake device 10 of the invention has a lever 22, which is disposed approximately parallel to the brake disk 14 in the disk brake caliper 12. The lever 22 is pivotable about an imaginary pivot axis that is displaceable in the longitudinal direction of the lever 22 and extends parallel to an imaginary plane defined by the brake disk 14. The displacement of the pivot axis of the lever 22 in the longitudinal direction thereof will be described in further detail hereinafter. The brake shoe 20 rests on the lever 22, near one end thereof. By pivoting of the lever 22 in the direction of the brake disk 14, the brake shoe 20 is displaced, and the wheel brake lining 18 is pressed against the brake disk 14. A stop 24 limits a reverse-pivoting angle of the lever 22.

An energy-storing spring element 26 is disposed on another end of the lever 22, remote from the brake shoe 20. The energy-storing spring element 26, in the exemplary embodiment of the invention shown and described, is embodied as a helical compression spring, which is supported on a fixed abutment 28 in the disk brake caliper 12. The energy-storing spring element 26, embodied as a helical compression spring, is disposed on the same side of the lever 22 as the brake shoe 20.

The lever 22 has a curved sliding-block slot 30, which is engaged by a sliding-block peg 32. The sliding-block peg 32 is mounted solidly on a support block 34, which has a spindle nut 36 with which the support block 34 is mounted on a spindle 38. The spindle 38 extends approximately parallel to the lever 22, so that the support block 34 with the sliding-block peg 32 is displaceable in the longitudinal direction of the lever 22. The support block 34, with the sliding-block peg 32 engaging the sliding-block slot 30 of the lever 22, forms a support means for the lever 22 that pivotably supports the lever 22. The sliding-block peg 32 defines the imaginary pivot axis of the lever 22, which axis is displaceable in the longitudinal direction of the lever 22. The sliding-block slot 30 and the sliding-block peg 32 form a nonrectilinear sliding guide 30, 32 of the lever 22. The sliding-block slot 30 is curved in convex fashion, as viewed from the direction of the brake disk 14, and in concave fashion, as viewed from the direction of the spindle 38, and the lever 22 is disposed between the brake disk 14 and the spindle 38. The curvature of the sliding-block slot 30 can be in the form of a circular arc or arclike curve or the slot can be curved in any other way. The course of the curvature of the sliding-block slot 30 will be described in more-precise detail hereinafter.

The spindle nut 36 of the support block 34 and the spindle 38 form a spindle drive 36, 38 of the wheel brake device 10 of the invention. For driving the spindle 38 to rotate, the wheel brake device 10 has an electric motor 40, which is capable of driving the spindle 38 to rotate either directly or indirectly via a gear mechanism, not shown, and in this way of displacing the support means 32, 34 in the longitudinal direction of the lever 22.

Figure 2:
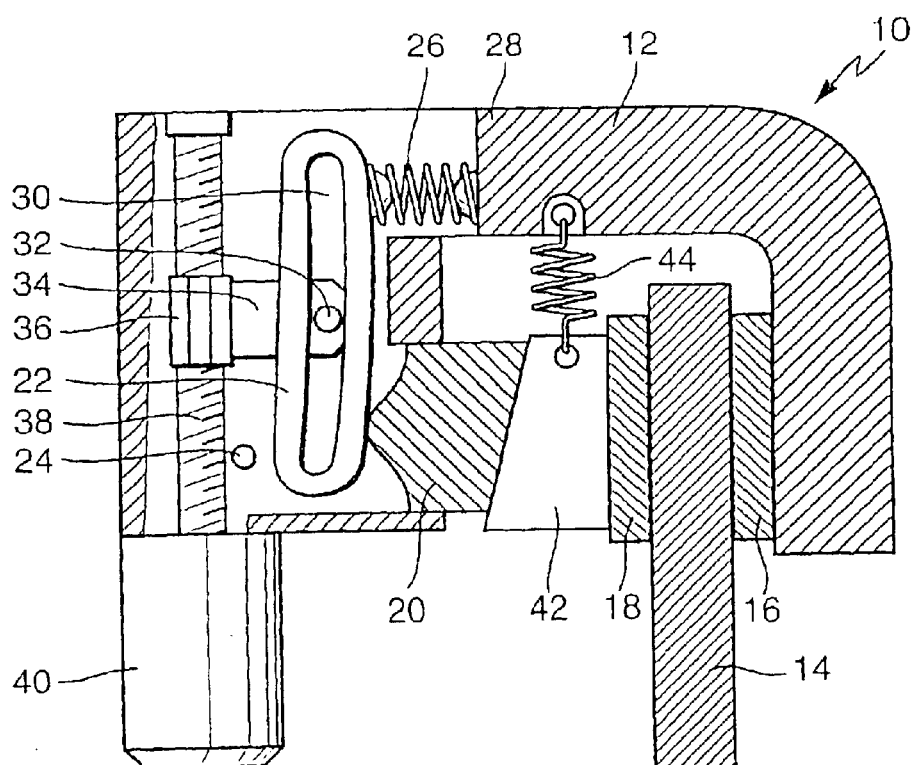
FIG. 2 is the wheel brake device of FIG. 1 in the actuated state.

In a released position of the wheel brake device 10 (FIG. 1), the support means 32, 34 is located in the region of the end of the lever 22 that is engaged by the energy-storing spring element 26. The lever 22, on its end remote from the energy-storing spring element 26, rests on the stop 24, and the wheel brake linings 16, 18 are lifted from the brake disk 14. For actuating the wheel brake device 10, the support means 32, 34 is displaced in the direction of the brake shoe 20 by means of the electric motor 40 and the spindle drive 36, 38. As a comparison of FIG. 1 and FIG. 2 shows, by means of such a displacement of the support means 32, 34 of the lever 22, an effective lever arm with which the lever 22 engages the brake shoe 20, or the brake shoe 20 engages the lever 22, shortens. The effective lever arm with which the lever 22 engages the brake shoe 20, or the brake shoe 20 engages the lever 22, is a spacing from the sliding-block peg 32 to an engagement point of the brake shoe 20 on the lever 22 in the longitudinal direction of the lever 22. Simultaneously with the shortening of the effective lever arm with which the lever 22 engages the brake shoe 20, an effective lever arm with which the energy-storing spring element 26 engages the lever 22 lengthens as a result of the displacement of the support means 32, 34 of the lever 22 in the direction of the brake shoe 20. The effective lever arm with which the energy-storing spring element 26 engages the lever 22 is the spacing of an engagement point of the energy-storing spring element 26 on the lever 22 from the sliding-block peg 32 in the longitudinal direction of the lever 22. Because of the displacement of the support means 32, 34 of the lever 22 in the direction of the brake shoe 20, the energy-storing spring element 26 pivots the lever 22 and via the lever 22 and the brake shoe 20 presses the wheel brake lining 18 against the brake disk 14; the brake disk 14 is braked. If the support means 32, 34 is displaced farther in the direction of the brake shoe 20, then the effective lever arm with which the energy-storing spring element 26 engages the lever 22 is lengthened, and the effective lever arm with which the lever 22 engages the brake shoe 20 is shortened further, so that the force with which the energy-storing spring element 26, via the lever 22, presses the wheel brake lining 18 against the brake disk 14 increases. The force with which the energy-storing spring element 26, via the lever 22, presses the wheel brake lining 18 against the brake disk 14 increases with the displacement of the support means 32, 34 in the direction of the brake shoe 20, because of the changing lever ratio, even taking into account a diminishing spring force of the energy-storing spring element 26 because of a lengthening of the energy-storing spring element 26. The force with which the energy-storing spring element 26, via the lever 22, presses the wheel brake lining 18 against the brake disk 14 can thus be adjusted in a finely metered way by displacement of the support means 32, 34 in the longitudinal direction of the lever 22.

For releasing the wheel brake device 10, the support means 32, 34 of the lever 22 is displaced back to the engagement point of the energy-storing spring element 26 on the lever 22; this shortens the effective lever arm of the energy-storing spring element 26 to zero, and the energy-storing spring element 26 exerts no further force on the brake shoe 20, and the wheel brake device 10 is released. Upon displacement of the support means 32, 34 back to the engagement point of the energy-storing spring element 26 on the lever 22, energy previously exerted by the energy-storing spring element upon pressing the wheel brake lining 18 against the brake disk 14 is stored back in the energy-storing spring element 26 again. This energy is again available for a new actuation of the wheel brake device 10. For an active release of the wheel brake device 10, the support means 32, 34 can be displaced away from the brake shoe 20, beyond the engagement point of the energy-storing spring element 26. The energy-storing spring element 26 then pivots the lever 22 away from the brake disk 14, against the stop 24. This reverse pivoting motion of the lever 22 can be utilized for lifting the wheel brake lining 18 from the brake disk 14.

The curvature or course of the sliding-block slot 30, which forms the sliding guide 30, 32 for the support means 32, 34 of the lever 22, is selected such that upon displacement of the support means 32, 34, at the applicable support point where the support means 32, 34 pivotably supports the lever 22, the sliding-block slot 30 extends parallel or at least approximately parallel to the spindle 38. Since as described above the lever 22 pivots as a result of the displacement of its support means 32, 34, the sliding-block slot 30 is curved, so that the sliding guide 30, 32 of the lever 22, at the applicable support point formed by the support means 32, 34, extends parallel or virtually parallel to the displacement direction of the support means 32, 34, that is, to the spindle 38. If the sliding-block slot 30 at each support point extends parallel to the spindle 38, then for pivoting the lever 22, no force has to be exerted, and thus no force has to be exerted for pressing the wheel brake lining 18 against the brake disk 14, either. The force for pivoting the lever 22 and for pressing the wheel brake lining 18 against the brake disk 14 is brought to bear in this case solely by the energy-storing spring element 26. If at the applicable support point the sliding-block slot 30 extends approximately parallel to the spindle 38, then some of the force required for pivoting the lever 22 and thus for pressing the wheel brake lining 18 against the brake disk 14 is brought to bear by the support means 32, 34, and thus by the electric motor 40, while the remaining, larger portion of the force is brought to bear by the energy-storing spring element 26. A torque required by the electric motor 40 for actuating the wheel brake device 10 of the invention by displacement of the support means 32, 34 in the longitudinal direction of the lever 22 is consequently low.

For adjusting an air gap, that is, a gap between the wheel brake linings 16, 18 and the brake disk 14 while the wheel brake device 10 is released, the wheel brake device 10 has an automatic readjusting device 42, 44. The readjusting device 42 includes a wedge, which is disposed transversely displaceably in the brake shoe 20 between the brake shoe 20 and the wheel brake lining 18. The wedge 42 is urged in the transverse direction of the brake shoe 20 by a spring element 44, and in the exemplary embodiment of the invention shown and described, the spring element 44 is embodied as a helical tension spring, which is suspended from the wedge 42 and the disk brake caliper 12. With increasing wear of the wheel brake linings 16, 18, the spring element 44 displaces the wedge 42 farther into a wedge-shaped gap in the brake shoe 20, so that the air play of the wheel brake device 10 remains constant.

By means of the automatic readjusting device 42, 44, it is attained that the angular position of the lever 22 is independent of any wear of the wheel brake linings 16, 18. The effective lever arms with which the energy-storing spring element 26 and the brake shoe 20 engage the lever 22 are as a result independent of any wear status of the wheel brake linings 16, 18 and are dependent solely on the displacement of the support means 32, 34 of the lever 22 in the longitudinal direction of the lever 22. The force with which the energy-storing spring element 26 presses the wheel brake lining 18 against the brake disk 14 via the lever 22 is thus independent of any wear of the wheel brake linings 16, 18.

The foregoing relates to preferred exemplary embodiment of the invention, it being understood that other variants and embodiments thereof are possible within the spirit and scope of the invention, the latter being defined by the appended claims.

What is claimed is:

1. A wheel brake device for a motor vehicle, having a wheel brake lining that for generating a braking moment can be pressed against a brake body connected to a vehicle wheel in a manner fixed against relative rotation, the wheel brake device (10) comprising
    a pivotable lever (22), with which the wheel brake lining (18) can be pressed against the brake body (14) by pivoting of the lever (22);
    an energy-storing spring element (26), which at a point spaced apart from the wheel brake lining (18) engaging and urging the lever (22) in the direction of pressing the wheel brake lining (18) against the brake body (14);
    the lever (22) including a nonrectilinear sliding guide (30, 32) pivotally supporting the lever (22) on a support means (32, 34),
    the support means (32,34) being displaceable in the longitudinal direction of the lever (22) and providing a fulcrum about which the lever (22) pivots; and
    a course of the sliding guide (30, 32) of the lever (22) being selected such that as the support means (32, 34) is displaced along the longitudinal direction of the lever (22), the course of the sliding guide (30, 32) extends at least approximately parallel to a displacement direction of the support means (32, 34).

2. The wheel brake device of claim 1, wherein the support means (32, 34) of the lever (22) is displaceable, in the longitudinal direction of the lever (22), between an engagement point of the energy-storing spring element (26) on the lever (22) and an engagement point of the wheel brake lining (18) on the lever (22).

3. The wheel brake device of claim 1, wherein the wheel brake device (10) further comprises a spindle drive (36, 38) for displacing the support means (32, 34) of the lever (22).

4. The wheel brake device of claim 3, wherein the wheel brake device (10) further comprises an electric motor (40) for driving the spindle drive (36, 38) to rotate.

5. The wheel brake device of claim 1, wherein the wheel brake device (10) further comprises a readjusting device (42, 44) for adjusting an air gap between the wheel brake lining (18) and the brake body (14) when the wheel brake device (10) is unactuated.

6. The wheel brake device of claim 5, wherein the readjusting device (42, 44) is embodied as automatic.

7. The wheel brake device of claim 6, wherein the readjusting device (42, 44) comprises a wedge (42) which is displaceable against the brake body (14), transversely to a contact-pressure direction of the wheel brake lining (18).

* * * * *